J. H. SMITH.
BORING TOOL.
APPLICATION FILED SEPT. 20, 1920.
1,418,485. Patented June 6, 1922.
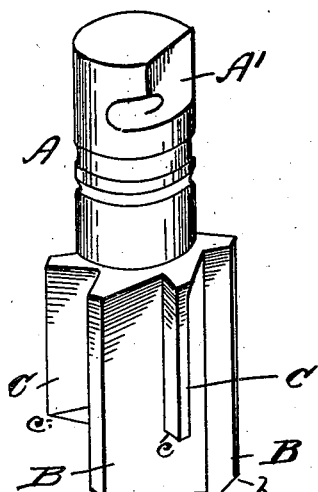
Fig. 1
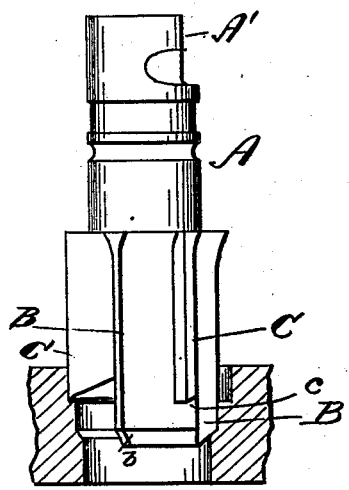
Fig. 2
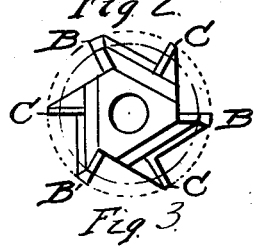
Fig. 3
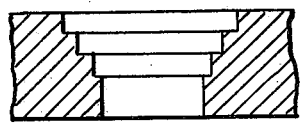
Fig. 7
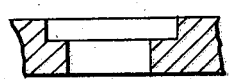
Fig. 8
Fig. 9
Fig. 10
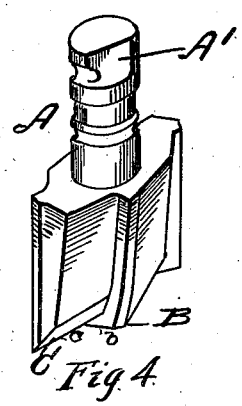
Fig. 4
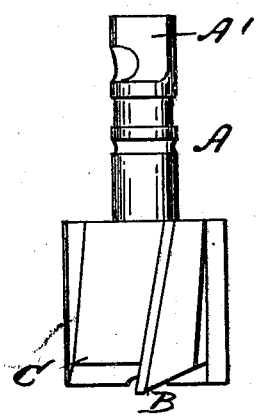
Fig. 5
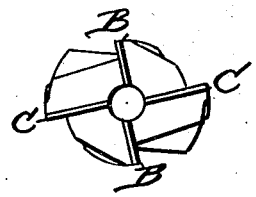
Fig. 6
Inventor
John Hugo Smith
By S. E. Thomas
Attorney

UNITED STATES PATENT OFFICE.

JOHN HUGO SMITH, OF DETROIT, MICHIGAN, ASSIGNOR, BY MESNE ASSIGNMENTS, TO THE ECLIPSE INTERCHANGEABLE COUNTERBORE COMPANY, OF DETROIT, MICHIGAN, A CORPORATION OF MICHIGAN.

BORING TOOL.   REISSUED

1,418,485.   Specification of Letters Patent.   Patented June 6, 1922.

Application filed September 20, 1920. Serial No. 411,537.

*To all whom it may concern:*

Be it known that I, JOHN HUGO SMITH, a citizen of the United States, residing at Detroit, county of Wayne, State of Michigan, have invented a certain new and useful Improvement in Boring Tools, and declare the following to be a full, clear, and exact description of the same, such as will enable others skilled in the art to which it pertains to make and use the same, reference being had to the accompanying drawings, which form a part of this specification.

My invention relates to boring tools shown in the accompanying drawings and more particularly described in the following specification and claims.

One of the objects of this invention is to construct a tool which is adapted to "spot face," bore, or counterbore a plurality of holes or surfaces of different sizes; the number, diameter, and length of the teeth being alternately disposed according to the number of stepped surfaces required—the smallest diameter having the longest ribs or flutes, the next largest diameter having relatively shorter ribs or flutes, and so on.

While boring tools have been constructed with teeth or flutes of a plurality of stepped dimensions "in line," they cannot be readily ground and their usefulness is soon impaired due to the fact that in grinding the tool the relative depth of the bore to the counterbore cannot be maintained on account of the ever-changing length of the flutes between the "steps".

It is therefore a further object of this invention that the ribs or flutes of the respective diameters should be of the same diameter throughout;—each group alternating with those of different diameter that they may be more readily sharpened or ground, and that the length of each group of teeth of one diameter may be maintained with reference to the cutting end of the teeth of the next alternating diameter,—thus the chip clearance and life of the tool is greatly increased and too many bearing points are avoided.

With the foregoing and other objects in view which will appear as the description proceeds the invention further resides in the details of construction hereinafter described and claimed, it being understood that changes may be made in the precise embodiment of the invention herein disclosed without departing from the spirit of the same.

In the accompanying drawings forming part of this specification:—

Figure 1 is a perspective view of a tool which may also be used to counterbore,—or bore holes of relatively different diameters.

Figure 2 is a side elevation of the tool as it would appear when making a counterbore.

Figure 3 is an end elevation of the tool.

Figure 4 is a perspective view of the tool as constructed for "spot facing" one or more stepped surfaces.

Figure 5 is a side elevation of the tool shown in the preceeding view.

Figure 6 is an end elevation of the tool shown in Figures 4 and 5.

Figures 7, 8, 9, and 10 are cross-sectional views through pieces of metal showing the character of the work performed by the tool.

Referring now to the letters of reference placed upon the drawings:—

A, denotes the shank of a boring tool, having the usual flattened portion A' to secure it against turning in a holder (not shown).

B, are relatively long cutting ribs or flutes, alternating with shorter cutting ribs or flutes C, of larger diameter,—the distance between the cutting ends *b* of the ribs B, and the cutting ends *c* of the ribs C being such as will admit the necessary length of bore, required in conjunction with the proper depth of counterbore. The outer ends of the radial ribs form the cutting teeth and the ribs of less diameter extend outwardly or longitudinally of the head of the tool beyond the ends of the ribs of greater diameter, and the rib of smaller diameter constitute pilot teeth and by extending substantially the entire length of the head of the tool the cutting ends or teeth of the ribs may be maintained in proper relation.

When used for stepped "spot facing" the cutting ends of the respective groups of flutes are more nearly on the same plane, as indicated in Figures 4 and 5. If it is desired to use the tool shown in Figures 1 and 2 to bore a hole corresponding with the flutes of enlarged diameter, it will be found that the longer flutes serve as a pilot to guide the relatively shorter flutes in boring the hole of the diameter required.

As indicated in Figures 7, 8, 9, and 10, the tool may be used to bore a plain hole, or bore single or stepped counterbores, or to bore and "spot face" as may be required. It will also be noted that the tool may be ground and sharpened and the same relative distance between the cutting ends of the respective alternate groups of flutes be maintained:—a result not obtainable where each flute is itself stepped, due to the usual undercutting at the end of each stepped portion,— which must be provided in order that it may be properly ground.

It will also be particularly noted that by constructing the tool with groups of flutes alternately different in length that greater chip clearance is thereby provided.

Having thus described my invention what I claim is:—

1. A tool of the character described, comprising a head, and a plurality of integral radial ribs, the outer ends of which form cutting teeth, said ribs being alternately spaced and different in length and diameter and the ribs of less diameter constituting pilot teeth and projecting beyond the ends of the ribs of greater diameter and extending substantially the entire length of the head, whereby the proper relation between the cutting ends of the ribs may be maintained at all times.

2. A tool of the character described, comprising a head, and a plurality of integral spaced radial ribs of alternately different length and diameter, the outer ends of the ribs constituting cutting teeth and the cutting teeth of each group of ribs of the same length and diameter being spaced from and on a different plane from the cutting teeth of the group of ribs of relatively different length and diameter, the ribs of less diameter being extended beyond the ends of the ribs of greater diameter and also extending substantially the length of the head.

3. A boring tool of the character described, comprising a head, and a plurality of integrally spaced radial ribs of alternately different length and diameter, the outer ends of the ribs constituting cutting teeth and the cutting teeth of each group of ribs of the same length and diameter being spaced from and on a different plane from the cutting teeth of the group of ribs of relatively different length and diameter, the ribs of less diameter being extended outwardly beyond the cutting ends of the ribs of greater diameter and also extending inwardly along the head in parallelism and overlapping relation of the said ribs of greater diameter, whereby the proper relation between the cutting ends of the ribs may be maintained until at least one group of the ribs is worn away.

In testimony whereof I sign this specification in the presence of two witnesses.

JOHN HUGO SMITH.

Witnesses:
S. E. THOMAS,
IDA GOREN.